Aug. 5, 1930.  C. A. MARIEN  1,772,104
ENGINE PISTON
Filed Sept. 12, 1928
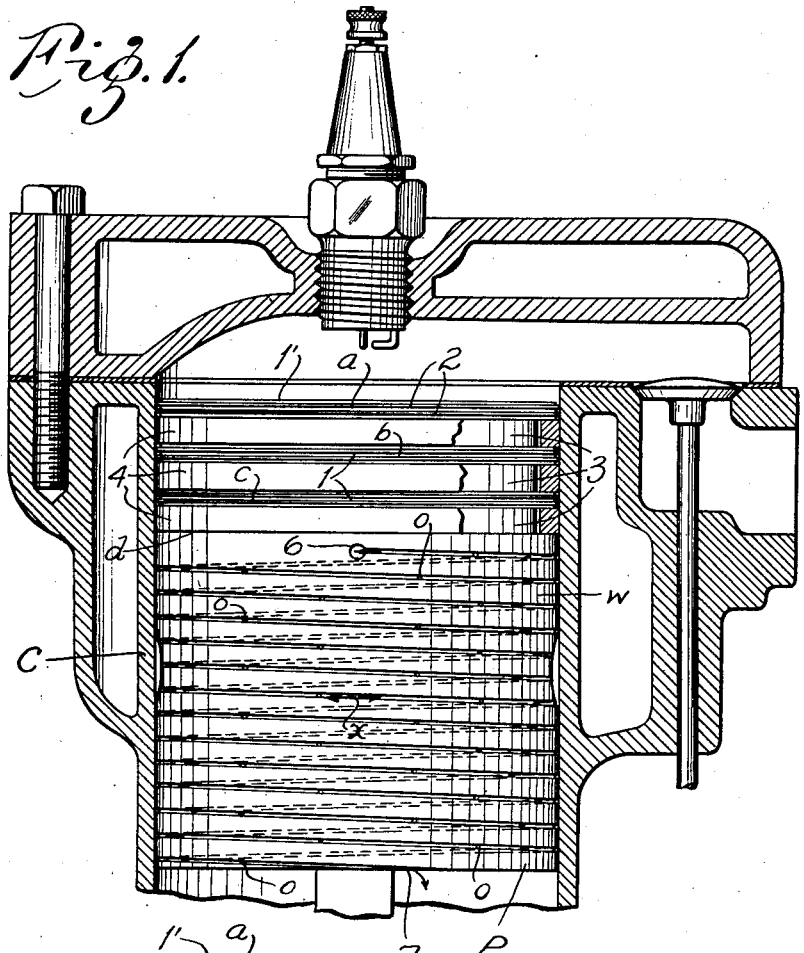
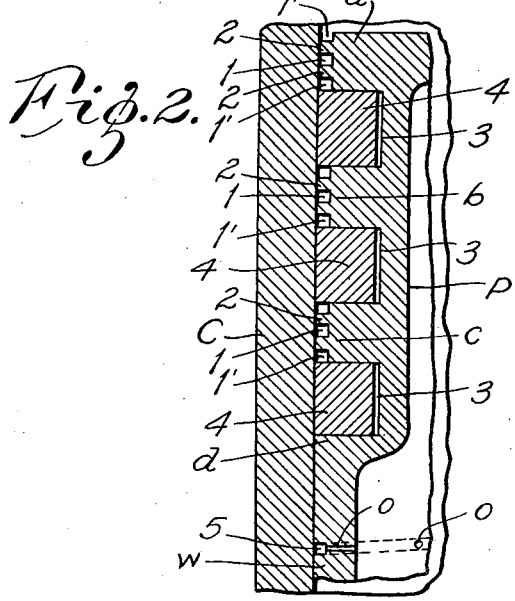
INVENTOR:
CHARLES A. MARIEN.
BY Harry A. Benner
ATTORNEY Patented Aug. 5, 1930

1,772,104

UNITED STATES PATENT OFFICE

CHARLES A. MARIEN, OF ST. LOUIS, MISSOURI

ENGINE PISTON

Application filed September 12, 1928. Serial No. 305,382.

My invention has relation to improvements in pistons for internal combustion engines, and is directed more particularly to alloy pistons, which have a greater co-efficient of expansion than the cylinders in which they operate. This invention is included in the generic principles of that disclosed in my co-pending application Ser. No. 214,732, filed Aug. 22, 1927, and is an enlargement and extension of those principles. The novel features of construction are more fully set forth in the specification and pointed out in the claims.

Briefly, the invention comprises a piston having a series of alternate ridges and grooves on the ring lands, which readily permit the piston to rapidly wear down in use until the proper clearance is obtained, and a continuous helical oil groove formed on the piston skirt through which excess oil may flow until it leaves the piston wall.

The principal objects of the invention, as in the application above referred to, are to provide a piston having its surface prepared in a manner that will enable the piston to quickly wear to the proper size, and at the same time dispose of the ground off material so it will not score the cylinder wall. A further object is to provide the ring lands with grooves for retaining surplus oil; and to provide means on the piston skirt for draining surplus oil therefrom. Further and other advantages will be better apparent from a detailed description of the invention in connection with the accompanying drawings, in which—

Figure 1 is a vertical transverse section through an internal combustion engine showing my improved piston therein with part of the wall broken away; and Figure 2 is an enlarged sectional detail of the upper part of the piston wall.

Referring to the drawings C represents the cylinder of an internal combustion engine fitted with my improved piston P made from an aluminum alloy, which is lighter and softer than a cast iron piston, and has a greater co-efficient of expansion. Because of the greater expansion of the alloy piston more clearance must be provided in the cylinder; hence, the clearance must be more precise than when cast iron pistons are used to avoid excessive play and the introduction of a piston slap. I obtain the exact clearance required for proper working of the piston by forming alternate grooves and ridges on the ring lands of the piston and fitting the piston into the cylinder with just enough clearance to permit reciprocation. The engine is then started and as the piston becomes heated and expands the narrow edges of the ridges presented to the cylinder will be gradually worn off by abrasion against the cast iron wall of the cylinder until the proper working clearance is obtained. Ordinarily the ridges need be provided only at the head end that is exposed to the high temperature of the burning gases and consequently undergoes the greatest expansion.

The shape of the ridges and grooves differs from those of the piston shown in my co-pending application Ser. No. 214,732 in that the alternate grooves 1 and ridges 2 formed on each of the ring lands $a$, $b$ and $c$ are square instead of V-shaped and both are approximately one thirty-second inch deep and one thirty-second inch wide which dimensions I have found by experience to be desirable. Square ridges present a more substantial bearing surface than V-shaped ridges and the square grooves will trap a larger amount of oil than V-grooves, which is an advantage in some cases. On each ring land (in the present instance) there are two ridges 2, 2 separated by a groove 1 and bounded on the outside by annular recesses 1', 1' on the margins of the ring land. The recesses 1' have the same dimensions as the grooves 1. Between the ring lands the usual piston ring grooves 3 are formed to receive the piston rings 4.

The piston wall $w$ below the ring lands is provided with a helical groove 5, said groove extending from an opening 6 a short distance below the bottom ring land $d$ to the bottom of the piston skirt. The groove 5 is approximately one thirty-second inch wide and one thirty-second inch deep and is open at both ends so that an excess of oil may drain therefrom as will be hereinafter explained. Openings $o$ may be provided in the bottom of the groove to facilitate draining of surplus oil.

When the piston is first put into operation, it will, of course, expand and metal will be ground from the surface of the ridges 2, 2 as above explained. As rapidly as this wear occurs, the cuttings will be forced into the grooves 1 and 1' which serve as receptacles for the cuttings thus preventing them from falling between the cylinder wall and piston where they would score said wall. The grooves 1 and 1' also serve as reservoirs for excess oil, which on being pumped upwardly over the piston under the action of the vacuum induced in the cylinder, will accumulate in the grooves where it will be held together by the cohesion of the particles and thus resist the forces tending to draw it into the cylinder. It is common in the case of ordinary pistons for oil to work behind the rings during the operation of the piston, and this oil may be very readily forced past the ring lands and ultimately into the cylinder. This oil movement can not take place to any appreciable extent in my improved piston because the larger body of oil accumulated in the grooves is not readily dislodged by the forces in the cylinder. Thus, thorough lubrication of the piston is provided for and at the same time the oil is controlled and prevented from moving upwardly into the cylinder.

The entire piston is covered with an oil film, as is well known, and during the reciprocation of the piston the oil is forcibly spread both upwardly and downwardly along the piston wall. The degree to which this depends on the angularity of the piston rod as well as the wear of both the cylinder and the piston and resulting play therebetween.

In order to prevent the rapid travel of the oil over the cylinder wall as just set forth I have provided the helical groove 5 into which any accumulations of oil will gather and when the oil is caused to move along the cylinder wall by the forces mentioned it will follow through the groove 5 in both directions as indicated by $x$. Ultimately the oil will drain from the top of the groove through the opening 6 and also through the bottom 7 of the groove which is open. The openings $o$ also permit excess oil to drain out. Thus, it is impossible for an excess amount of oil to accumulate on the piston since the groove 5 carries off the excess at the same time permitting sufficient oil for thorough lubrication.

Under present practise a greater clearance is provided for alloy pistons than for cast iron pistons, and it is extremely difficult to guard against excessive clearance with its accompanying evils. In my improved piston exact clearance is obtained without the necessity of making allowance for abnormal cylinder conditions. Whatever adjustment may be necessary for this purpose is automatic.

Of course, the invention is equally applicable to cast iron pistons. Although they do not expand to the same extent as alloy pistons, they do expand in a greater ratio than the cylinder because not provided with cooling means as is the cylinder. I therefore wish it to be plainly understood that pistons of any suitable material are within the scope of the invention.

Having described my invention, I claim:

1. A piston provided with ring grooves on the upper part thereof, and ring lands bounding said grooves, alternate grooves and ridges formed on the periphery of the lands, said grooves and ridges having their side faces parallel and the grooves being adjacent to the ring grooves.

2. A piston provided with ring grooves on the upper part thereof, and ring lands bounding said grooves, alternate grooves and ridges formed on the periphery of the lands, said grooves and ridges having their side faces parallel and their depth and breadth of equal dimension.

3. A piston provided with ring grooves on the upper part thereof, and ring lands bounding said grooves, alternate grooves and ridges formed on the periphery of the lands, said grooves and ridges having their side faces parallel and being approximately one thirty-second inch deep and one thirty-second inch wide.

4. A piston provided with ring grooves on the upper part thereof, and ring lands bounding said grooves, alternate grooves and ridges formed on the periphery of the lands, and a helical oil groove on the piston wall extending downwardly from an opening below the ring lands.

5. A piston provided with ring grooves on the upper part thereof, ring lands bounding said grooves, and alternate grooves and ridges formed on the periphery of the lands, said ridges being rectangular in cross-section.

6. A piston provided with ring grooves on the upper part thereof, ring lands bounding said grooves, a helical oil groove formed on the piston wall below the ring lands and making a plurality of turns around said wall, and the piston wall being traversed by a plurality of openings leading from the bottom of said oil groove.

In testimony whereof I hereunto affix my signature.

CHARLES A. MARIEN.